United States Patent
McCormack

(10) Patent No.: US 11,160,420 B2
(45) Date of Patent: Nov. 2, 2021

(54) THERMOMETER RECEIVER AND COOKING DEVICE

(71) Applicant: Andrew McCormack, Stockton, CA (US)

(72) Inventor: Andrew McCormack, Stockton, CA (US)

( * ) Notice: Subject to any disclaimer, the term of this patent is extended or adjusted under 35 U.S.C. 154(b) by 420 days.

(21) Appl. No.: 16/226,413

(22) Filed: Dec. 19, 2018

(65) Prior Publication Data
US 2020/0196801 A1    Jun. 25, 2020

(51) Int. Cl.
| | | |
|---|---|---|
| *G01K 13/00* | (2021.01) | |
| *A47J 43/28* | (2006.01) | |
| *A47L 17/06* | (2006.01) | |
| *G01K 15/00* | (2006.01) | |

(52) U.S. Cl.
CPC ............. *A47J 43/288* (2013.01); *A47L 17/06* (2013.01); *G01K 15/00* (2013.01); *A47J 43/283* (2013.01); *A47J 2202/00* (2013.01); *G01K 13/00* (2013.01); *G01K 2207/06* (2013.01)

(58) Field of Classification Search
CPC ...... G01K 1/14; G01K 2207/06; G01K 13/00; G01K 15/00; A47J 43/288; A47J 43/283; A47J 45/068
See application file for complete search history.

(56) References Cited

U.S. PATENT DOCUMENTS

| | | | | |
|---|---|---|---|---|
| 2,602,407 | A * | 7/1952 | Swann | B61D 17/16 52/19 |
| 2,898,845 | A * | 8/1959 | Dight | G01K 1/14 99/421 TP |
| 3,535,770 | A * | 10/1970 | Crandell | G01K 1/14 228/165 |
| 3,695,110 | A * | 10/1972 | Biolik | A61J 9/02 374/157 |
| 3,707,015 | A * | 12/1972 | Maynard | A47J 36/20 220/759 |
| 4,580,909 | A * | 4/1986 | McIntosh | A47J 43/283 294/3 |
| 5,575,563 | A * | 11/1996 | Chiu | G01K 1/14 374/141 |
| 5,620,255 | A * | 4/1997 | Cook, III | A47J 43/28 374/141 |

(Continued)

FOREIGN PATENT DOCUMENTS

| | | | | |
|---|---|---|---|---|
| CA | 2713058 A1 * | 2/2011 | | A47J 43/283 |
| CN | 105877551 A * | 8/2016 | | |

(Continued)

*Primary Examiner* — Gail Kaplan Verbitsky
(74) *Attorney, Agent, or Firm* — Omni Legal Group; Omid E. Khalifeh; Ariana Santoro

(57) ABSTRACT

A stirring or mixing device is configured to optionally receive a cooking thermometer along a vertical edge such that acts of mixing, stirring, and/or even scraping foodstuff within a food preparation receptacle may be performed simultaneously with measuring temperature of such foodstuff. The device comprises a handle and stirring or mixing head defining a receiving channel configured to elastically retain an elongated thermometer probe. In addition, the device may define cutouts operative to expose portions of a retained probe to direct contact with foodstuff.

3 Claims, 4 Drawing Sheets

(56) References Cited

U.S. PATENT DOCUMENTS

| | | | |
|---|---|---|---|
| 6,539,842 B1* | 4/2003 | Chapman | A47J 37/041 374/155 |
| D479,807 S * | 9/2003 | Norcross | D10/57 |
| 7,100,953 B1* | 9/2006 | Tarlow | A47J 43/283 294/104 |
| 7,421,787 B2 | 9/2008 | White et al. | |
| 7,451,722 B2* | 11/2008 | Parker | G01K 11/18 116/216 |
| D628,447 S | 12/2010 | Genatossio et al. | |
| 8,746,765 B1* | 6/2014 | Mafi | A47J 43/288 294/7 |
| 9,027,194 B2 | 5/2015 | Silva | |
| D746,112 S | 12/2015 | Holcombe | |
| 9,980,612 B2* | 5/2018 | Neumann | A47J 45/02 |
| 10,444,080 B2* | 10/2019 | Brown | A47J 36/321 |
| 2002/0073853 A1 | 6/2002 | Norcross | |
| 2004/0123469 A1* | 7/2004 | Wilkinson, Jr. | A47J 43/283 30/137 |
| 2004/0247015 A1* | 12/2004 | Wojan | G01K 1/14 374/120 |
| 2006/0203878 A1* | 9/2006 | Pearl | G01K 1/026 374/141 |
| 2009/0232187 A1* | 9/2009 | Perry | G01K 1/08 374/209 |
| 2013/0305893 A1* | 11/2013 | Kaufman | A47J 43/283 83/30 |
| 2015/0093480 A1 | 4/2015 | Biever | |
| 2015/0342412 A1 | 12/2015 | Noorzai | |
| 2017/0150841 A1* | 6/2017 | Johncock | A47J 27/002 |

FOREIGN PATENT DOCUMENTS

| | | | |
|---|---|---|---|
| DE | 29721916 U1 * | 3/1998 | A47J 43/281 |
| EP | 1239703 A2 * | 9/2002 | H05B 3/68 |
| FR | 2247184 A1 * | 5/1975 | G01K 1/14 |

* cited by examiner

THERMOMETER RECEIVER AND COOKING DEVICE

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to cooking implements and, more particularly, to cooking implements configured to be combinable with another and thus be optionally multifunctional.

BACKGROUND

Innumerable tools have been introduced in the marketplace to improve home and professional cooking. Thermometers, for instance, are indispensable for measuring the temperatures of meat, breads, confections, and other foodstuff. This is because the temperature of certain food frequently correlates with the degree to which such food is finished cooking and/or whether it is safe for consumption. As such, it is not unusual to find amateur and professional chefs alike with cooking thermometers close at hand.

Popular varieties of cooking thermometers comprise a temperature-sensing probe that is inserted into food and a temperature display. However, simply probing mixable food, including liquids, with a thermometer may not always be convenient or provide an accurate method of obtaining its temperature. For example, temperature distribution may be uneven among discrete, mixable pieces of the foodstuff depending, for example, on the frequency that it has been mixed or stirred and where in relation to a conductive surface and/or heat source the temperature is taken. Measuring the temperature of liquid or semifluid foods such as stews and soups may even be dangerous as a user supports a thermometer in hot fluids, which can burn them in addition to risking damage to the thermometer should it become fully submerged in the foodstuff.

Some solutions have been proposed to address the problems associated with using food thermometers. For example, some thermometers are configured to hook onto an inner side of a cooking receptacle, such as a stock pot, eliminating a need for a user to personally hold a thermometer in a risky manner while taking temperature measurements. This, however, may cause misleading temperature readings because the thermometer is likely to sense relatively warmer temperatures as a result of its proximity to the side or surface of the receptacle. Additionally, these are not conveniently formed to latch on to shallow receptacles such as pans.

Another solution has been to provide a buoyant thermometer. These may be difficult to read in steamy environments, however, and may further interfere with a user's interaction with ingredients in the receptacle.

Another proposed solution has been to integrate temperature sensing functionality into the body of other useful cooking devices. For example, mixing devices, including various types of spoons and spatulas, are also must-haves for chefs of all kinds. Spatulas in particular may be effective for stirring foodstuff to evenly combine ingredients and/or ensure heat distribution during cooking, and may even been formed as a means for additionally scraping insides and bottoms of cooking receptacles such as stock pots, mixing bowls, pans, and others. Some cooking devices having thermometers integrated thereon include, for example, U.S. Publication No. 2015/0093480 filed by Biever, teaching a barbecue utensil configured to alternatively support a thermometer, spatula, cleaning brush and basting brush; U.S. Publication No. 2015/0342412 filed by Noorzai, teaching a multifunctional kitchen tool loaded with a plurality of retractable tools including, for example, a spatula and a thermometer; and U.S. Pat. No. 6,591,739 to Norcross teaching a thermometer with detachable heads, such as a spatula and a fork, including temperature sensing circuitry as well as a food piercing member for piercing solid foodstuffs and sensing the internal temperatures of such foodstuffs. These arrangements are characterized by a number of deficiencies, though. For instance, they preclude simultaneous operation of both the stirring or mixing tools along with the temperature sensing tools. Such cooking devices also must be used in conjunction with thermometers specially formed to engage with them.

Thus, there remains a need for a thermometer receiver and stirring device.

SUMMARY

The present disclosure is directed to a cooking device such as a spatula, spoon, spoonula, or bowl scraper for example, which is configured to optionally receive a cooking thermometer such that the thermometer may be maintained in a position along the length of the device. In this manner, a cook may conveniently mix, stir, or even scrape food while simultaneously measuring its temperature.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the device comprises a handle terminating in a food handling head. It is contemplated that the head and handle may be formed as a single molded piece or as discrete, joined elements without departing from the invention. More particularly, however, the head may define a channel operative to retain an elongated thermometer probe, such as any of a variety of those known to those skilled in the art, along an outer edge of the head.

In some embodiments, the channel may traverse at least some of the vertical length of the head. It is contemplated that at least the upper portion of the head may define an opening corresponding to an end of the channel through which a thermometer probe may be inserted. In addition to such opening, the outer edge of the head may optionally define a slot granting access to a probe along the length of the channel. In such embodiments, it is contemplated that any material comprising at least the edge of the head corresponding with such slot is elastic and resilient so as to prevent the probe from accidentally slipping out of the channel through the slot while the device is in use with a thermometer.

In some embodiments, the head of the device may further define one or more cutouts which separate the channel into successive lengths such that one or more portions of a thermometer probe retained in the channel may be exposed on all sides to any foodstuff that it comes into contact with. Further, a bottom-most portion of the head may define a stopper configured to prevent a terminal end of the thermometer probe from extending beyond a bottom edge of the head of the device. Indeed, this may additionally ensure that a temperature display is maintained above the food handling head so that a user may conveniently read characters on such display.

Several advantages of one or more aspects of the invention are to provide a cooking device that:

Improves temperature-taking procedures during cooking;

Provides a mixing or stirring device that is widely compatible with a variety of thermometers;

Minimizes any effect that material comprising cooking receptacles and other devices has on temperature sensed by a thermometer;

Enables simultaneous mixing or stirring and temperature taking; and

Avoids integration of digital or chemical temperature sensing devices into the body of the cooking device.

One or more of the above-disclosed embodiments, in addition to certain alternatives, are provided in further detail below with reference to the attached figures. The disclosed subject matter is not, however, limited to any particular embodiment disclosed.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to exemplary preferred embodiments of the invention. While the disclosure will be described in connection with these embodiments, there is no intent to limit it to the embodiment or embodiments disclosed herein. Rather, the intent is to cover all alternatives, modifications and equivalents included within the spirit and scope of the disclosure as defined by the appended claims.

Figure 1:
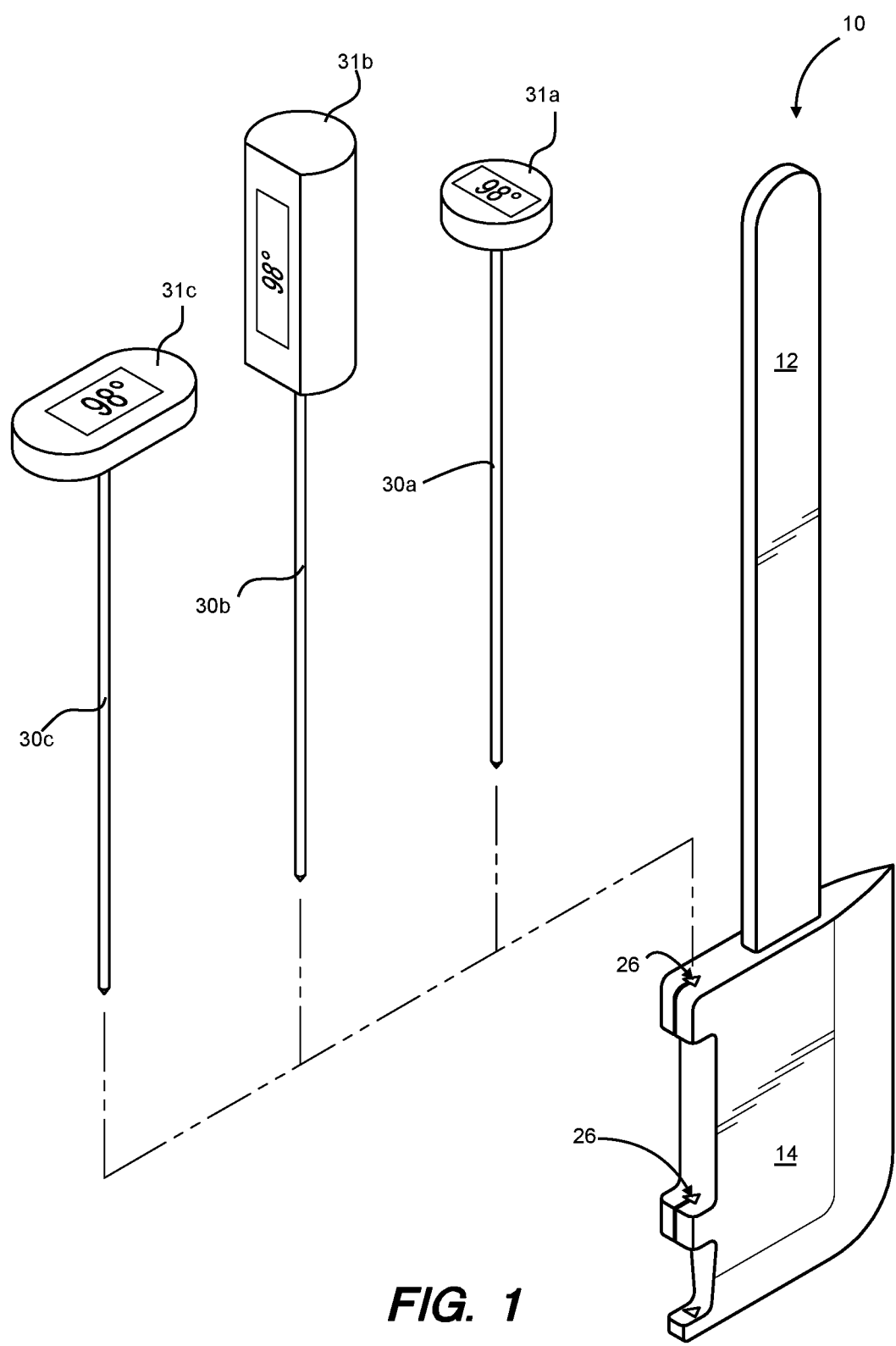
FIGS. 1 and 2 show a perspective view of a thermometer receiver and cooking device in accordance with an embodiment of the invention.
Figure 2:
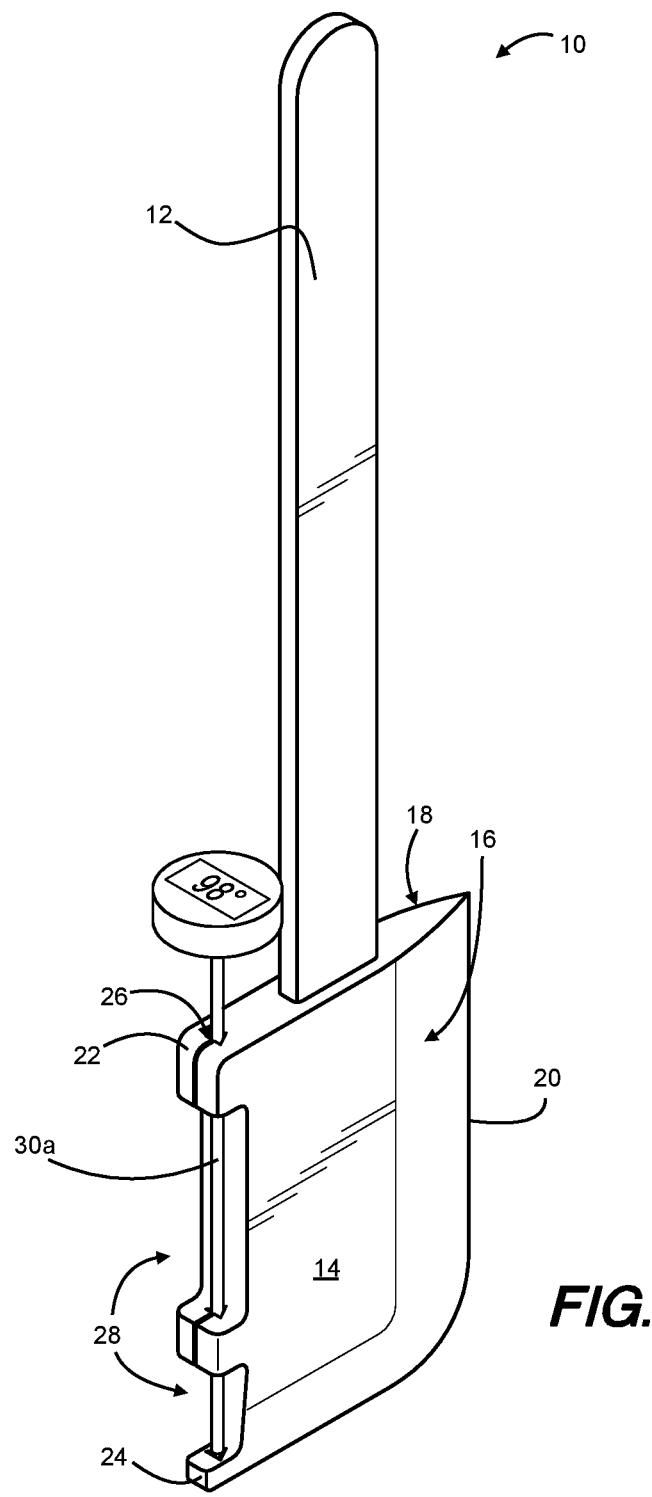

With reference to FIGS. 1 and 2, the cooking device 10 may comprise a handle 12 terminating in a food handling head 14. It is contemplated that the head 14 and handle 12 may be formed as a single fully integrated piece or, as in the non-limiting example shown in the figures, as discrete, joined elements. It may further be seen that the exemplary head 14 of the cooking device 14 is formed as that associated with a bowl scraper type of spatula, simply referred to herein as "spatula." However, it is contemplated that the head 14 may be configured as any of those associated with cooking devices capable of mixing, stirring, or even scraping. For instance, the head 14 may comprise a concave depression associated with spoons or spoonulas. The head 14 may comprise a whisk head. The head 14 may comprise a relatively uniformly thick spatula head. Thus, it should be understood that the foregoing are offered by way of example only, and not limitation, and further that the particular type or shape of the head 14 will not limit the invention.

With particular reference to FIG. 2 and the exemplary bowl scraper spatula head 14, various configurations are contemplated. One embodiment of the spatula head 14 may comprise a solid, molded member defined generally by a front side 16 and a back side joined 18 together by a continuous side edge. In some embodiments, a first portion of the edge may be formed as a tapered wedge 20 extending outwardly from the center of the spatula head 14. This configuration may define a thin edge adapted to scraping foodstuff from any surface of a pot, pan, or other receptacle containing such foodstuff. While such wedge 20 is shown to have a smooth, curved shape, it is of course possible for such wedge 20 to define an angled shape as well.

In some embodiments, second portion 22 of the edge may define some thickness greater than the tapered wedge 20 and meet such tapered edge along a corner 24 defining the outer perimeter of the head 14. Such second portion 22 of the edge may define a retention channel 26 disposed vertically along the second portion 22 of the edge configured to optionally retain a temperature-sensing portion of a thermometer, discussed in greater detail below.

It may be seen that the head 14 of the device further defines one or more cutouts 28 which separate the channel 26 into successive lengths such that one or more portions of a thermometer probe 30a retained in the channel 26 may be exposed on all sides to any foodstuff that it comes into contact with. In other words, the one or more cutouts 28 may be provided to expose at least some of the probe 30a from its retained position within the channel 26. It is contemplated that doing so will increase the surface area of direct contact between the temperature-sensing probe and foodstuff whose temperature is to be measured. This may ensure that an accurate temperature reading is achieved while sensing temperature in conjunction with the device.

In some embodiments, the retention channel 26 may traverse the greater part of the length of the head 14. As such, in some embodiments, it may be possible to insert a temperature sensing portion of the thermometer into the channel 26 from an open end of such channel disposed on a top end of the spatula head 14, directly visible from an overhead perspective in FIG. 3. An exemplary cross-section of such channel 26 may be triangular, as shown. It is contemplated that shaping the channel in this manner may enable the device 10 to frictionally maintain such probe in place via multiple points of tangential contact, however, as illustrated in FIG. 4, an alternative retention channel 26b may define other desirable cross-sectional shapes as well, such as the non-limiting example of a circle.

Figure 3:
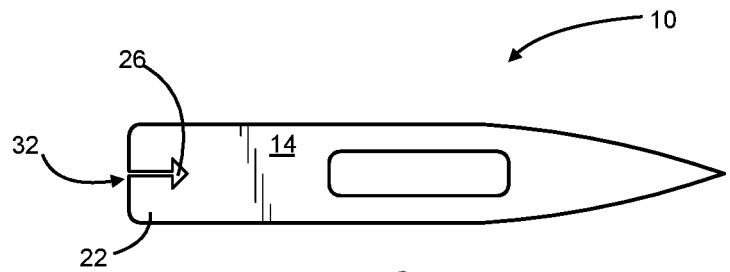
FIG. 3 shows a bird's-eye view of a thermometer receiver and cooking device in accordance with an embodiment of the invention.
Figure 4:
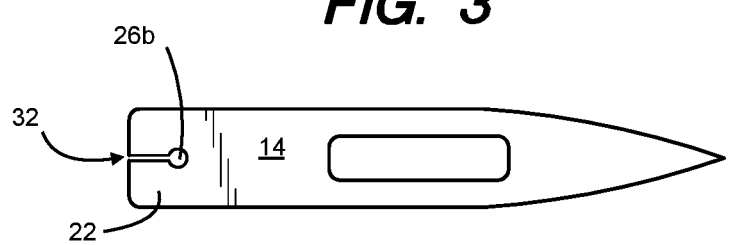
FIG. 4 shows a bird's-eye view of a thermometer receiver and cooking device in accordance with another embodiment of the invention.

With continued reference to FIGS. 3 and 4 in some embodiments, a slot 32 may be vertically disposed along the periphery of the second portion 22 of the edge of the head 14 and further be placed in communication with the length of the channel 26, 26b such that a thermometer probe may be pressed into the channel 26, 26b via the vertical slot 32. Indeed, in such embodiments, it is contemplated that the head 14 comprise materials that are at least somewhat elastic and rugged enough to withstand repeated manipulation as a user optionally inserts and removes a thermometer probe from the channel by way of the slot 32. It is contemplated that the material comprising the spatula head should be chosen to resist substantial deflection while in use, so that a thermometer may be securely retained within the channel 26, 26b, but should also be flexible enough to deflect in order to receive and a thermometer probe therethrough. Suitable materials may include food safe silicone, rubber, or nylon, and plastic. These may be additionally desired for their beneficial insulating properties which may render them unlikely to significantly interfere with the temperature detected by the thermometer. As such, the spatula head 14, or other cooking device, may comprise heat resistant and relatively non-conductive materials. Indeed, configuring the cooking device as such may avoid undesirably influencing temperature detected by the probe, which might otherwise occur on account of the close proximity of the thermometer probe and cooking device.

Figure 5:
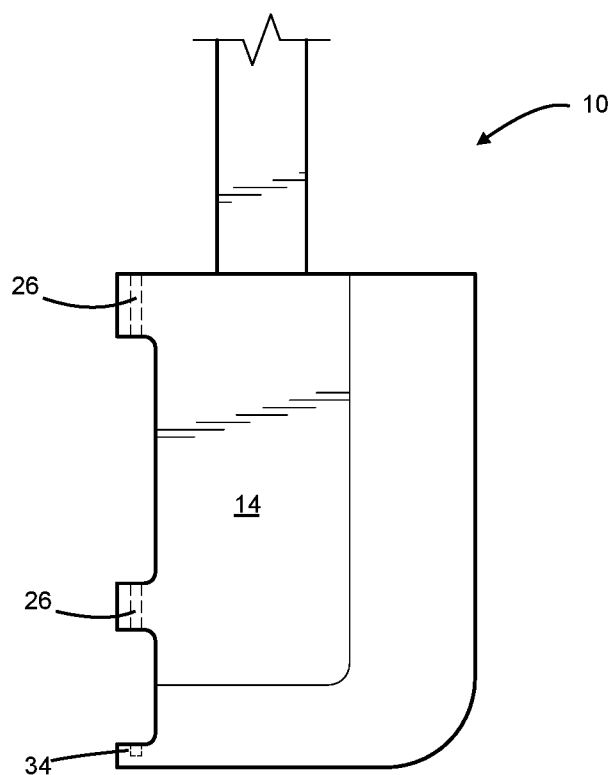
FIG. 5 shows a planar view of a thermometer receiver and cooking device in accordance with an embodiment of the invention.
Figure 6:
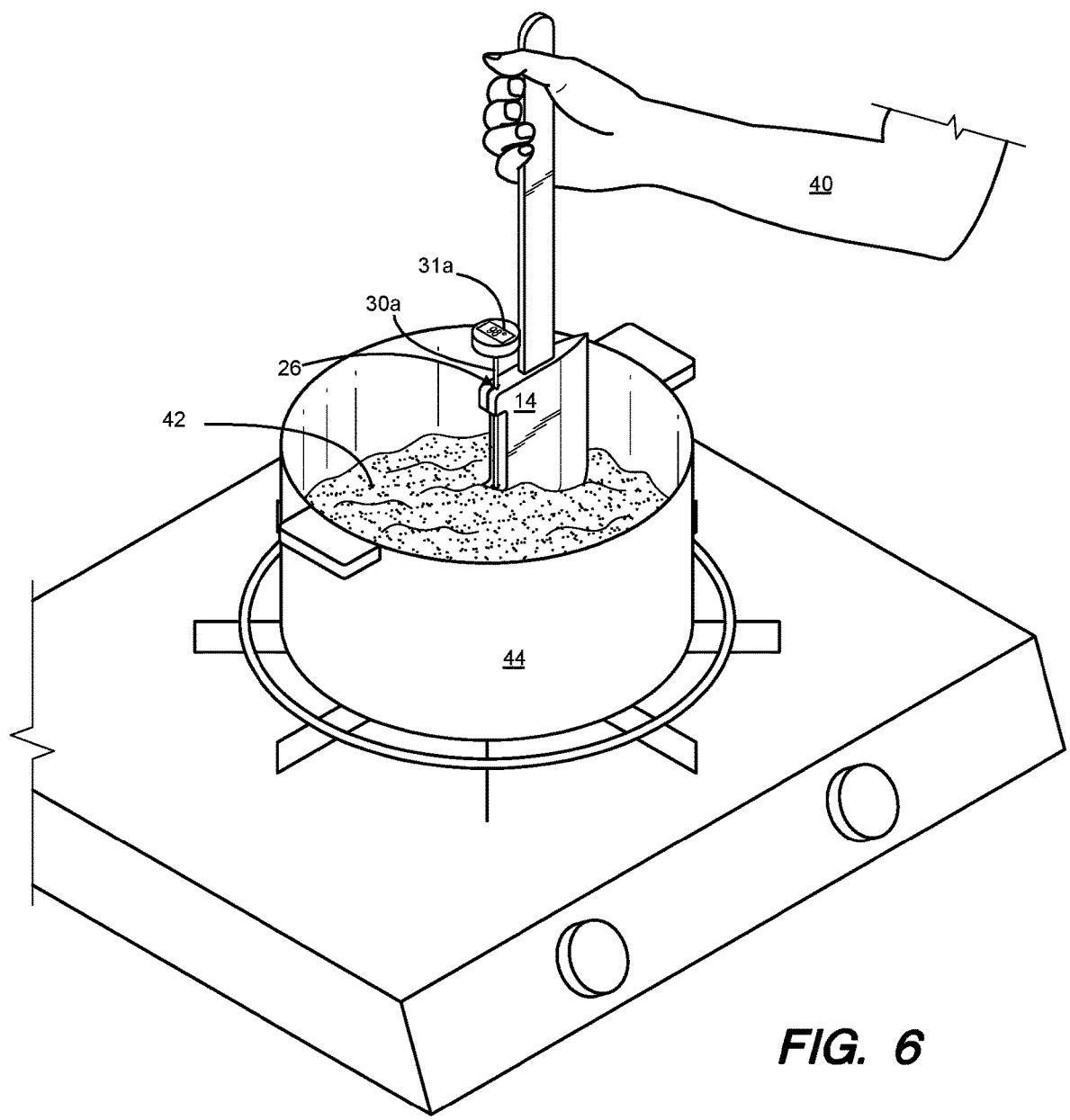
FIG. 6 illustrates a cook using an embodiment of the cooking device in conjunction with a thermometer to simultaneously mix foodstuff and measure its temperature.

Turning to FIG. 5 it is further contemplating that a bottom-most portion of the head 14 may define a stopper 34 configured to prevent a terminal end of a thermometer probe from extending beyond a bottom edge of the head 14 of the device 10 through the channel 26. Indeed, because a temperature read-out portion of a thermometer may be wider than the temperature probe, one skilled in the art will recognize that the read-out portion may be easily maintained above the channel and therefore readable to the user. Additionally, providing a stopper 34 may elevate a read-out or display portion of a thermometer, effectively preventing such read-out or display portion of the thermometer from becoming submerged in foodstuff over the course of mixing, stirring, or scraping with the device 10. This arrangement is more clearly visible in FIG. 6, in which a temperature display 31a, is depicted as spaced above the head 14 owing to the length of the channel 26, which terminates with the stopper (not visible), relative to the length of the thermometer's temperature-sensing probe 30a. Thus, a user 40 may conveniently stir, mix, or even scrape foodstuff within a receptacle while simultaneously observing its temperature.

Returning to FIG. 1, an embodiment of the channel 26 may be configured to retain an elongated thermometer probe 30a, 30b, 30c characteristic of a variety of thermometers known to those skilled in the art, along an outer edge of the head 14. For instance, it may be seen that the particular orientation of a temperature display 31a, 31b, 31c of the thermometer will not limit the invention. Indeed, while the exemplary thermometers are shown as having digital temperature displays 31a, 31b, 31c, it is contemplated that the invention may be practiced, if desired, with a thermometer having an analogue display or even a chemical thermometer instead. Indeed, various cooking activities may benefit from use of different thermometers depending, for example, on desired temperature ranges and/or required precision and/or accuracy. For instance, frying oil may need to reach much higher temperatures than bread, benefitting from use of a thermometer capable of displaying a relatively higher range of temperatures than might otherwise be used. Likewise, relatively increased precision and/or accuracy may be desired in, for example, tempering chocolate and making caramel from sugar and therefore confection making may be improved by a particularly precise thermometer. Thus it should be clear that the cooking device 10 may be configured to receive a variety of thermometers as needed or desired on a case-by-case basis.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the thermometer receiver and cooking device with which that terminology is associated. In general, the terms used in the following claims should not be constructed to limit the thermometer receiver and cooking device to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the thermometer receiver and cooking device is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the universal thermometer receiver and stirring device.

I claim:

1. A spatula, comprising:
   a handle terminating in a head, the head defined by a front side and a back side joined by a side edge, the side edge comprising at least a first portion formed as a tapered wedge extending outward from a center portion of the head and a second portion defining a thickness greater than an outermost portion of the tapered wedge,
   wherein the second portion of the edge defines a retention channel configured to optionally retain a temperature sensing probe of a thermometer and an upper portion of the head defines an opening corresponding to an end of the channel configured to receive a temperature sensing probe into the channel therethrough, and
   wherein a bottom-most portion of the head defines a stopper corresponding to an end of the channel, the stopper configured to prevent a temperature sensing probe retained within the channel from extending beyond such bottom-most portion of the head.

2. The spatula of claim 1, wherein the second portion of the edge further defines a slot in vertical communication with the retention channel, and wherein the slot is operative to both receive a temperature sensing probe therethrough and maintain such temperature sensing probe within the channel.

3. The spatula of claim 1, wherein the second portion of the edge further defines at least one cutout which separates the channel into successive lengths such that at least a portion of a temperature sensing probe retained therein is exposed.

* * * * *